(No Model.)

E. R. SARGENT & W. E. STEVENS.
COFFIN HANDLE.

No. 447,086. Patented Feb. 24, 1891.

Witnesses
J. H. Shumway
L. D. Kelsey

Edward R. Sargent
and William E. Stevens
Inventors
By Atty. Earle Seymour

THE NORRIS PETERS CO., PHOTO-LITHO., WASHINGTON, D. C.

UNITED STATES PATENT OFFICE.

EDWARD R. SARGENT AND WILLIAM E. STEVENS, OF NEW HAVEN, CONNECTICUT, ASSIGNORS TO THE SARGENT & COMPANY, OF SAME PLACE.

COFFIN-HANDLE.

SPECIFICATION forming part of Letters Patent No. 447,086, dated February 24, 1891.

Application filed November 21, 1890. Serial No. 372,152. (No model.)

*To all whom it may concern:*

Be it known that we, EDWARD R. SARGENT and WILLIAM E. STEVENS, of New Haven, in the county of New Haven and State of Connecticut, have invented a new Improvement in Coffin-Handles; and we do hereby declare the following, when taken in connection with accompanying drawings and the letters of reference marked thereon, to be a full, clear, and exact description of the same, and which said drawings constitute part of this specification, and represent, in—

Figure 1:
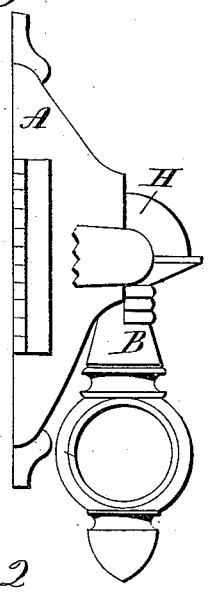
Figure 4:
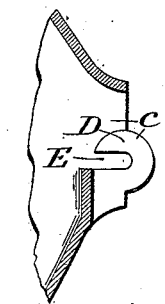
Figure 3:
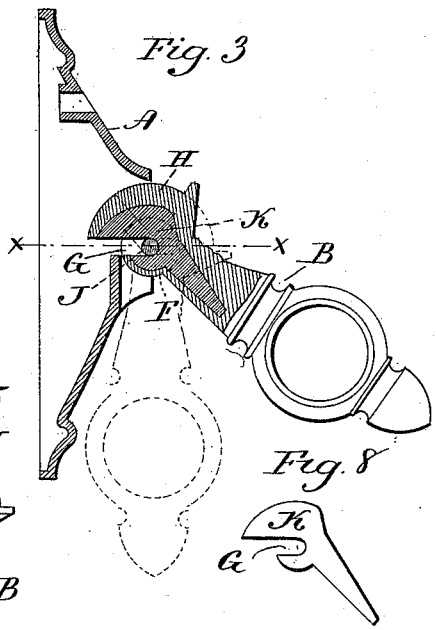
Figure 5:
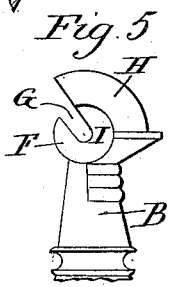
Figure 8:
Figure 2:
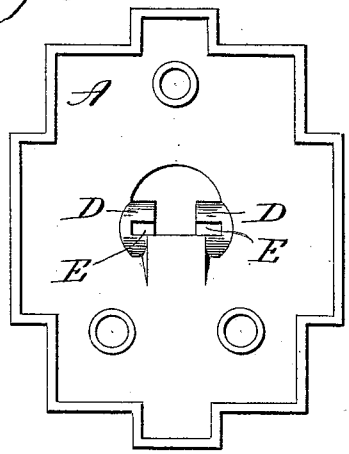
Figure 6:
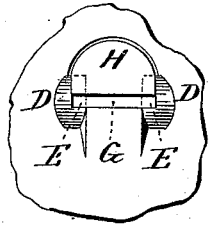
Figure 7:
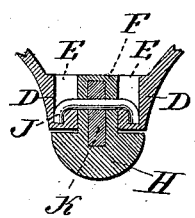

Figure 1, a side view of the socket with the arm hung therein; Fig. 2, a rear view of the socket; Fig. 3, a vertical central section through the socket and arm; Fig. 4, a vertical central section through the socket, the arm removed, showing one of the cheeks; Fig. 5, a side view of the arm, illustrating the recesses which encircle the cheeks; Fig. 6, a rear view of the socket with the arm in place, as represented in Fig. 3, to receive the pivot; Fig. 7, a transverse section cutting on line *x x* of Fig. 3, the arm in the down position; Fig. 8, the hard-metal body as prepared for introduction to the arm.

This invention relates to an improvement in that class of coffin-handles in which a socket is adapted to be secured to the coffin and an arm hinged in said socket carrying the handle-bar, and so that the arm may swing as upon a pivot in the socket, and so as to hang down substantially vertical when at rest, but be lifted into a horizontal position when required for use. In the more general construction of this class of handles the socket is constructed with ears, between which the hinging end of the arm is placed and a pivot passed through the ears of the socket and the end of the arm, and so that the arm may swing on this pivot. The drilling and fitting for the application of this pivot is an expensive operation.

The object of our invention is a construction which will avoid the drilling of the socket and arm for the introduction of the pivot; and the invention consists in the construction, as hereinafter described, and particularly recited in the claims.

A represents the base of the socket, which is adapted to be secured to the side of the coffin. It may be of any suitable design, the particular shape of this base or socket constituting no part of the present invention.

B represents the arm, which is also of any desirable shape or design. Through the face of the socket is an opening C, through which the upper end of the arm may work, as usual. On each side of this opening cheeks D are formed, between which a corresponding portion of the arm may set. These cheeks are each constructed with a groove E in its face opening to the rear and of a diameter substantially the diameter of the pivot, but preferably slightly less. Their position corresponds to the position required for the pivot, and the recesses extend forward to the position where it is desired the pivot shall rest. That portion F of the arm through which the pivot is to extend in thickness corresponds to the distance between the two cheeks D D, as seen in Fig. 3, and transversely through this portion F a groove G is cut corresponding to the diameter of the pivot required. The cheeks D are of cylindrical shape, as seen in Fig. 4, and the head H of the arm is recessed upon its sides, as at I, corresponding to the said cylindrical cheeks, that portion of the head surrounding the said recesses corresponding in shape to the opening C through the socket. The groove G in that portion F of the arm which stands between the cheeks D D is in a plane at an angle to the plane of the grooves E in the cheeks when the arm hangs vertically, as indicated in broken lines, Fig. 3, but so that when the arm is turned into the position seen in Fig. 3 the groove G in the arm will come into line with the grooves E in the respective cheeks.

When the arm stands in the position seen in Fig. 3, with the groove G in line with the grooves E of the cheeks, a piece of wire for the pivot J is set into the grooves E of the cheeks and G of the arm and forced to the bottom of the grooves. Preferably this pin is of a diameter so as to require considerable force to drive it into the grooves E of the cheeks D, whereas the groove G of the arm is somewhat larger in diameter, so that the pivot will pass more freely through that groove.

While the arm stands in the position seen in Fig. 3 the recesses I in its respective sides overhang the cheeks D, as seen in broken lines in Fig. 3, so that the cheeks prevent the arm from moving outward. The plane of the groove in the arm, as before stated, is at an angle to the grooves in the cheeks when the arm is in the down position, and this angle is preferably such that the groove G of the arm is brought into line with the grooves E of the cheeks before the arm has reached its up position, and as represented in Fig. 3.

After the pivot has been introduced, as described, it is held firmly by the cheeks, it having been forced therein, and the arm is free to turn on the pivot in swinging up or down, substantially the same as if the pivot were introduced through holes formed in the cheeks and through the intervening part of the arm. The engagement of the arm with the cheeks by means of the recesses I in the arm takes the lifting strain very considerably from the pivot.

As the groove in the arm comes into line with the grooves in the cheeks only at a point intermediate between the down and up positions of the arms, there is little liability of accidental displacement of the pivot; but when the arm is either in the up or down position, so as to take the groove of the arm out of line with the grooves in the cheeks, then the pivot is securely held in the cheeks by the arm, and its escape is impossible. It is found, however, that the metal of which the parts are usually made adheres very closely to the harder metal of the pivot, so that there is little liability of displacement of the pivot if the grooves be such that a slight force is required to drive the pivot to its place.

The grooves in the cheeks may be slightly wider than, or substantially the same as, the diameter of the pivot, and the grooves in the arm made somewhat narrower, so that the pivot will be held by the arm instead of by the cheeks, as before described.

To strengthen the socket to prevent the spreading of the cheeks under the lifting strain brought thereon, the pivot J is preferably made of U shape, as seen in Fig. 7, its ends turned at right angles to the body of the pivot. The cheeks are constructed with recesses corresponding to the bent ends of the pivot and beyond the bottom of the grooves in the cheeks, as clearly seen in Fig. 7, and so when the pivot is set in place with the bent ends in the said recesses the said bent ends interlock with the two cheeks, so as to prevent the possibility of their spreading. This interlocking of the pivot with the cheeks adds materially to their strength.

To strengthen the arm at the pivot-point, a hard-metal body K is introduced into the pivot end of the handle in the process of casting. This piece K is best formed, as seen in Fig. 8, from hard metal, as iron or steel, and is of a shape to be embedded in the casting. The groove G is formed in this hard metal. The hard metal is preferably thinner than that portion of the arm which rests between the cheeks, so as to be completely inclosed by the metal of the arm. The strength which the introduction of this hard-metal body gives to the arm is too apparent to require to be particularly set forth.

The illustration of one style or shape of socket and arm will be sufficient to enable others skilled in the art to apply this invention to any of the various constructions of socket and swinging arm or handle.

Instead of making the groove in one of the parts of a diameter so much less than the diameter of the pivot as to make strong frictional contact between the pivot and the said narrow groove, so as to hold the pivot by frictional contact, the groove may be made so that the pivot will simply drop into its place. The position of the arm with relation to the socket, either in the normal or the uplifted position, is always such as to retain the pintle in its place. It is only at the particular intermediate position and where the arm is not liable to rest that it will be possible for the pivot to slip out of place, and this would rarely, if ever, occur in practical use. Again, the groove may be contracted upon the pivot after the pivot is set in place, if desired, which would serve to interlock the pivot, should there be occasion for so doing.

We claim—

1. In a coffin-handle having an arm hung upon a pivot in a socket, the socket constructed with cheeks between which the pivot end of the arm is introduced, the said cheeks constructed with grooves opening to the rear side of the socket and extending inward to the position required for the pivot, and the pivot end of the arm also constructed with a groove opening from the rear and corresponding to the said grooves in the cheeks, combined with a pivot introduced from the rear into the grooves of the cheeks and corresponding groove of the arm, substantially as described.

2. In a coffin-handle consisting of a socket and an arm pivoted therein, the socket constructed with cheeks between which the pivot portion of the arm is introduced, the cheeks and the arm constructed with corresponding grooves opening from the rear, and a U-shaped pivot corresponding in diameter substantially to the width of the said grooves, the grooves in the cheeks each constructed at its bottom with a recess corresponding to the lugs or bent ends of the pivot, and into which the said bent ends may project when the pivot is in place, substantially as and for the purpose described.

3. In a coffin-handle consisting of a socket and an arm hung therein, the socket constructed with cheeks between which the corresponding portion of the arm is introduced to receive the pivot, the cheeks and arm constructed with corresponding grooves opening to the rear, and a pivot introduced into said grooves from the rear and so as to form an axis upon which the arm may turn, the arm constructed with a hard-metal body or bearing-piece at the pivot end, and through which the said groove of the arm extends, substantially as and for the purpose described.

In testimony whereof we have signed this specification in the presence of two subscribing witnesses.

EDWARD R. SARGENT.
WILLIAM E. STEVENS.

Witnesses:
WM. S. COOKE,
CHAS. S. BALDWIN.